United States Patent Office 3,756,945
Patented Sept. 4, 1973

3,756,945
PROCESS FOR THE DECOMPOSITION OF NORMAL PARAFFIN-UREA ADDUCTS
Gerhard Wirtz, Kalbach, Taunus, Germany, assignor to Edeleanu Gesellschaft m.b.H., Frankfurt am Main, Germany
No Drawing. Filed Aug. 5, 1971, Ser. No. 169,504
Claims priority, application Germany, Aug. 6, 1970, P 20 39 120.2
Int. Cl. C07b 21/00
U.S. Cl. 208—25
4 Claims

ABSTRACT OF THE DISCLOSURE

The formation of an oil solvent-water azeotrope in a vessel for the decomposition of normal paraffin-urea adducts is substantially prevented by passing a hot stream of n-paraffins recovered from the decomposition vessel through a flash evaporation unit operated at a higher temperature and lower pressure than the decomposition vessel to remove oil solvent from the n-paraffins prior to their introduction into the decomposition vessel as part of the heat input thereto.

BACKGROUND OF THE INVENTION

This invention relates to the decomposition of solid adducts formed by urea and straight-chain organic compounds and more particularly n-paraffins, under the influence of heat and/or water. It is particularly related to reducing or eliminating the formation of an azeotrope of water and oil solvent in the decomposition step.

It is known that urea and straight-chain organic compounds form solid adducts, which has been described, for example, in "Annalen der Chemie," vol. 565 (1949), pp. 204–240, and vol. 732 (1970), pp. 70–96. Industrially, this process is used mainly in the field of mineral oil dewaxing. For convenience the term n-paraffins or normal paraffins will be used hereinafter for the adducted organic material.

In urea dewaxing processes normal paraffins are separated from hydrocarbon mixtures because of the ability of normal paraffins to pass within the crystalline structure of urea forming a solid adduct. After separating the adduct from the liquid components by filtration or centrifugation, it is decomposed by heat into its components in liquid form for ultimate recovery of the normal paraffins. The several processes which utilize this separation technique may be classified by the physical state of the urea when forming the adduct, to wit: (1) crystalline urea is mixed with the oil containing the normal paraffins, (2) the oil is percolated through a fixed bed of crystalline urea, (3) a dilute aqueous urea solution is contacted with the oil, or (4) a concentrated aqueous urea solution is contacted with the oil. Processes employing all four techniques are described in Fritz, "Urea Adduct Processes for n-Paraffin Recovery," in Proceedings of the Symposium on Normal "Paraffins" at page 29, European Chemical News Normal Paraffins Supplement, Dec. 2, 1966.

The subject of this invention relates to a urea dewaxing process where a concentrated aqueous urea solution is employed for adduct formation. In this dewaxing process, the hydrocarbon mixtures are diluted with oil solvents, preferably chlorinated hydrocarbons, for example, dichloromethane, and brought into intimate contact with highly concentrated aqueous solution of urea to form an adduct of urea and n-paraffins. This solid phase adduct is separated from the liquid phases by filtering or centrifuging and then is decomposed at elevated temperature, often aided by the addition of water, into urea and n-paraffins.

Regarding the use of normal paraffin-urea adducts on an industrial scale it is extremely important to obtain them in a relatively coarse grained condition in order to facilitate their removal from the remaining mineral oil by filtration and washing. A common method therefore is to manufacture adducts in the presence of solvents for both the urea and the mineral oil—cf., for example, German Pat. 1,225,328. Suitable urea solvents include water or lower alcohols, and suitable oil solvents include butane, pentane, lower ketones and especially halogenated hydrocarbons such as dichloromethane and the like. Although these solvents produce adducts in a coarsed grained condition, adduct decomposition into urea and n-paraffins by the addition of heat and/or water is often hampered due to the low boiling points of these oil solvents.

German Auslegeschrift 1,470,550 discloses the decomposition of adducts in two steps. The first step comprises spraying onto the adducts a hot stream of n-paraffins derived from the preceding decomposition step and evaporating the low-boiling oil solvent. In the second step, hot water is added to complete the adduct decomposition. However, it was found that, if the adduct had been formed in the presence of water, substantial quantities of water were entrained with the oil solvent, e.g., dichloromethane, being removed as a vapor from the top of decomposition vessel. Due to the azeotropic entrainment of water by the oil solvent the latter requires additional purification before its reuse, necessitating additional heat energy to be supplied by increasing the amount of n-paraffins recycled to supply heat to the adduct in the decomposition vessel.

It is possible to avoid the above described difficulty by conducting the adduct decomposition in a closed vessel as described in German Offenlegungsschrift 1,945,902. Since a pressure of about 4 atmospheres absolute would be expected in the decomposition vessel if dichloromethane were the solvent, this would necessitate relatively costly pressure-proof equipment.

It is therefore an objective of this invention to avoid the azeotrope formation in the decomposition vessel by means which would permit the use of normal operating pressures and avoid the necessity of employing high pressure equipment.

SUMMARY OF THE INVENTION

The formation of an azeotrope of water and oil solvent in the decomposition vessel in a urea dewaxing process is substantially eliminated by passing the recycle stream of n-paraffins through a flash evaporation unit to remove oil solvent from the n-paraffins prior to their introduction into the decomposition vessel as part of the heat input thereto.

DESCRIPTION OF THE PREFERRED EMBODIMENTS

In accordance with the present invention I have found that the decomposition of adducts containing both water and low-boiling oil solvents can be effected without formation of azeotropes and without the need for a substantial increase in the operating pressure in the decomposition vessel.

My invention, therefore, relates to a process for the decomposition of normal paraffin-urea adducts containing water and low-boiling oil solvents under the influence of heat, wherein part of the heat required for the decomposition is supplied directly by recycling a portion of the hot n-paraffins obtained from the decomposition of the normal paraffin-urea adduct, characterized in that said n-paraffin recycle stream is largely freed of the oil solvent contained therein before being introduced into the decomposition vessel.

Similar to the process disclosed in German Auslegeschrift 1,470,550, the process of the present invention relates to the separation in the decomposition vessel of a normal paraffin-urea adduct containing a small amount of residual oil solvent such as dichloromethane, into an aqueous urea phase and a normal paraffin phase which takes up the major part of the oil solvent. The two phases are then separated in a downstream separator. The urea phase is evaporated, to concentrate it if necessary, and is reused in adduct formation, while a portion of the normal paraffin phase is removed from the separator, passed through a heat exchanger where is it heated, for example, with steam, and recycled to the decomposition vessel.

Contrary to the process employed heretofore, the recycle stream of normal paraffins is introduced, according to the present invention, into a flash evaporation unit arranged intermediate the heat exchanger and the decomposition vessel where most of the oil solvent contained in the n-paraffins is removed at temperatures ranging from about 105 to 120° C. and at a pressure of about 1.1 atmospheres absolute. A vapor stream containing the oil solvent is withdrawn overhead from the flash evaporation column and subsequently condensed. The purified n-paraffins that collect at the bottom of the column are pumped back to the decomposition vessel. The solvent content of the purified n-paraffins corresponds with the temperature and pressure conditions maintained in the evaporator.

Since the evaporator must be operated, in accordance with my invention, at a higher temperature and a lower pressure than the decomposition vessel, the normal paraffin recycle stream is unsaturated, with regard to the oil solvent at the operating conditions of the decomposition vessel, and therefore is capable of taking up the oil solvent contained in the adduct, without thereby causing evaporation of the oil solvent in the decomposition vessel. This prevents the formation of an oil solvent-water azeotrope in the decomposition vessel, which occurred formerly.

By maintaining the pressure between 1.5 and 3.0 atmospheres absolute, preferably about 2 atmospheres absolute, in the decomposition vessel and in the separator, and at about 1.1 atmospheres absolute in the flash evaporation unit the required operative pressure gradient is attained.

Since, in accordance with my invention, neither the oil solvent nor its water azeotrope evaporate in the decomposition vessel, the adduct decomposition requires less heat and accordingly the amount of normal paraffins recycled to the decomposition vessel may be reduced. Thus, not only may the size of the equipment necessary for handling the n-paraffin recycle stream be reduced, but advantageously a lower and more favorable volume ratio of n-paraffin phase to urea phase may be employed. In fact, by the process of this invention this volume ratio will not exceed a value of about 10:1 leaving the decomposition vessel and in the separator. With higher ratios there is a risk that the oil and the aqueous urea solution will form an emulsion, thereby disturbing the course of the process and requiring additional separation steps.

According to the invention, the oil solvent which is present in the adduct and which passes to the n-paraffins freed by the adduct decomposition is stripped outside the decomposition vessel, thereby saving evaporation and cooling energy, reducing the amount of n-paraffins recycled for heating purposes and thus permitting a more favorable ratio of n-paraffin containing solvent to aqueous urea in the separator, without the risk of emulsification. In the process of this invention, the pressure in the decomposition vessel is maintained at 1.5–3 atmospheres absolute, preferably about 2 atmospheres absolute, which is low enough to permit operation of the process without any special pressure equipment.

Depending upon the use of the n-paraffins obtained as the main product stream the process of this invention may be modified by removing the oil solvent by distillation from the n-paraffins recovered from the adduct decomposition and recycling a portion of the purified product to the decomposition vessel.

The following example illustrates the process of this invention.

Example

In the conventional prior art process which employed an adduct formation temperature of 35° C. and a decomposition temperature of 85° C. the decomposition of 200 tons/hr. of adduct, consisting of 165 tons/hr. of urea solution and 35 tons/hr. of n-paraffins, required 19.2 million Kcal./hr. which had to be supplied to the decomposition vessel to evaporate about 50 tons/hr. of oil solvent and about 2 tons/hr. of entrained azeotropic water. The design of the decomposition vessel permitted only about 8 million Kcal./hr. to be supplied directly by means of a built-in heater, while the remaining amount of about 11.2 million Kcal./hr. had to be supplied by the n-paraffin recycle stream having a temperature of about 105° C. This required pumping about 1100 tons/hr. of n-paraffins through the recycle system. The n-paraffin to urea solution ratio in the separator was 10.4:1 parts by volume. 5.4 million Kcal./hr. were required for the condensation and cooling of the oil solvent-water vapors. The size of the decomposition vessel and the separator depends substantially upon the amount of n-paraffins recycled. The diameter of the decomposition vessel was approximately proportional to $Q^{0.4}$ ($Q=$ total amount of n-paraffin recycled); the volume of the separator was approximately proportional to $Q$.

Accordingly to the process of this invention due to the elimination of the heating and evaporating of 2 tons/hr. of water, only 18.0 million Kcal./hr. were required for an equal amount of adduct: this means a reduction in the heat load of 6.25%. Since the oil solvent was evaporated outside the decomposition vessel (requiring about 4.2 million Kcal./hr.), the decomposition vessel had to be supplied with only 13.8 million Kcal./hr. of which 8 million Kcal./hr. were supplied by direct heating. The n-paraffin recycle stream, therefore, had to supply no more than 5.8 million Kcal./hr., which is less than half of the required total heat. By reducing the amount of n-paraffin recycle, it was possible to reduce the diameter of the decomposition vessel by about 25%, the volume of the separator by 50% and the output of the circulating pump by 50%. Since heat required for condensing and cooling the solvent vapors amounted to 4.2 million Kcal./hr., 22% less cooling water and condenser surface were required. Finally, the volume ratio of the n-paraffin phase to the aqueous urea solution in the separator dropped to 5.4:1.

I claim:

1. In a process for the decomposition of normal paraffin-urea adducts formed in the presence of water and containing water and low-boiling oil solvents wherein said decomposition is conducted in a decomposition vessel under the influency of heat and wherein part of the heat required for the decomposition is supplied directly by recycling to the decomposition vessel a portion of the n-paraffins obtained at an elevated temperature by the decomposition of the normal paraffin-urea adduct, the improvement which comprises passing the n-paraffin recycle stream to a flash evaporation unit prior to its being introduced into the decomposition vessel, the flash evaporation unit being maintained at a higher temperature and lower pressure than the decomposition vessel whereby the n-paraffin recycle stream is freed of a substantial portion of the oil solvent contained therein, the operating conditions in the flash evaporation unit comprising a temperature of about 105 to 120° C. and a pressure of about 1.1 atmospheres absolute and the operating conditions in the decomposition vessel comprising a temperature of about 75 to 95° C. and a pressure of about 1.5 to 3 atmospheres.

2. A process according to claim 1 wherein the oil solvent is dichloromethane.

3. A process according to claim 2 wherein the temperature is about 85° C. and the pressure is about 2 atmospheres absolute in the decomposition vessel.

4. A process according to claim 1 wherein the oil solvent is dichloromethane and the volume ratio of n-paraffin phase to urea phase leaving the decomposition vessel is 10:1 maximum.

References Cited
UNITED STATES PATENTS
3,412,015   11/1968   Wiesche et al. _____ 208—25

HERBERT LEVINE, Primary Examiner

U.S. Cl. X.R.

260—96.5 R, 96.5 C

PO-1050
(5/69)

UNITED STATES PATENT OFFICE
CERTIFICATE OF CORRECTION

Patent No. 3,756,945    Dated August 5, 1971

Inventor(s) GERHARD WIRTZ

It is certified that error appears in the above-identified patent and that said Letters Patent are hereby corrected as shown below:

Column 4, Line 32, "accordingly" should read --according--; Line 58, "influency" should read --influence--.

Signed and sealed this 19th day of March 1974.

(SEAL)
Attest:

EDWARD M. FLETCHER, JR.
Attesting Officer

C. MARSHALL DANN
Commissioner of Patents